(12) United States Patent
Geissler et al.

(10) Patent No.: US 9,162,310 B2
(45) Date of Patent: Oct. 20, 2015

(54) ENHANCED POWER FACTOR CORRECTION FOR WELDING AND CUTTING POWER SUPPLIES

(75) Inventors: Steven J. Geissler, Fort Collins, CO (US); Todd G. Batzler, Hortonville, WI (US); Michael D. Madsen, Fremont, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1840 days.

(21) Appl. No.: 12/169,292

(22) Filed: Jul. 8, 2008

(65) Prior Publication Data
US 2010/0006551 A1  Jan. 14, 2010

(51) Int. Cl.
B23K 9/10 (2006.01)
B23K 9/09 (2006.01)
B23K 9/12 (2006.01)
H02M 5/42 (2006.01)
(Continued)

(52) U.S. Cl.
CPC ........... *B23K 9/1018* (2013.01); *H02M 1/4208* (2013.01); *B23K 9/091* (2013.01); *B23K 9/092* (2013.01); *B23K 9/1062* (2013.01); *Y02B 70/126* (2013.01)

(58) Field of Classification Search
CPC .... B23K 9/1006; B23K 9/1062; B23K 9/092; B23K 9/0956; B23K 9/1068; B23K 9/1056; B23K 9/091; B23K 11/252; H05B 6/04; H05B 6/06; H02M 1/14; H02M 7/062; H02M 7/7575; H02M 3/33507; Y02B 70/126
USPC .............. 219/130.1, 660, 130.5, 110, 137 PS, 219/130.21, 130.31, 130.32, 130.33, 219/130.51, 663, 665; 363/47, 44, 89, 53, 363/78, 79, 95, 97
See application file for complete search history.

(56) References Cited

U.S. PATENT DOCUMENTS 4,254,466 A * 3/1981 Jurek ............................ 700/212
5,019,952 A   5/1991 Smolenski et al.
(Continued)

FOREIGN PATENT DOCUMENTS

WO    2004071703 A   8/2004

OTHER PUBLICATIONS

FPGA-based all digital phase-locked loop controlled induction heating power supply operating at optimized ZVS mode IEEE Region 10 Annual International Conference, Proceedings/Tencon—2006 IEEE Region 10 Conference, Tencon 2006 2007 Institute of Electrical and Electronics Engineers Inc. US, Nov. 14, 2006, XP002512561.*

(Continued)

*Primary Examiner* — Dana Ross
*Assistant Examiner* — Hemant Mathew
(74) *Attorney, Agent, or Firm* — Quarles & Brady, LLP

(57) ABSTRACT

Enhanced power factor correction for a welding-based power supply includes a controller that tracks a rectified input voltage waveform and detects zero-crossing events therein. The controller generates an ideal sinusoidal current reference signal synchronized by expected zero-crossings in the supplied power. The reference signal is used in a current control loop within the controller to control the power electronics such that the waveform of the current drawn by the power supply matches the waveform of the input voltage. The frequency of the supplied power may be calculated using the expected zero-crossings and used to adjust the expected zero-crossings.

20 Claims, 4 Drawing Sheets

(51) Int. Cl.
*H02M 7/04* (2006.01)
*H02M 7/68* (2006.01)
*H02M 1/42* (2007.01)

(56) References Cited

U.S. PATENT DOCUMENTS

| | | | | |
|---|---|---|---|---|
| 5,963,022 A | * | 10/1999 | Buda et al. | 323/212 |
| 5,991,180 A | * | 11/1999 | Vogel et al. | 363/89 |
| 6,087,628 A | * | 7/2000 | Ferkel et al. | 219/130.5 |
| 6,115,273 A | * | 9/2000 | Geissler | 363/89 |
| 6,266,257 B1 | * | 7/2001 | Geissler | 363/56.05 |
| 6,300,723 B1 | * | 10/2001 | Wang et al. | 315/247 |
| 6,329,636 B1 | | 12/2001 | Geissler | |
| 6,426,888 B2 | * | 7/2002 | Geissler | 363/89 |
| 6,614,670 B1 | * | 9/2003 | Geissler | 363/56.01 |
| 6,625,046 B2 | * | 9/2003 | Geissler | 363/89 |
| 6,865,096 B1 | * | 3/2005 | Geissler | 363/89 |
| 7,141,759 B2 | | 11/2006 | Mela | |
| 7,319,206 B2 | | 1/2008 | Thommes | |
| 7,336,512 B2 | | 2/2008 | Geissler | |
| 2001/0026458 A1 | * | 10/2001 | Geissler | 363/16 |
| 2005/0047179 A1 | * | 3/2005 | Lesea | 363/47 |
| 2005/0185432 A1 | * | 8/2005 | Geissler | 363/89 |
| 2005/0275976 A1 | | 12/2005 | Taimela et al. | |
| 2006/0076332 A1 | | 4/2006 | Matus et al. | |
| 2006/0158912 A1 | | 7/2006 | Wu et al. | |
| 2007/0051712 A1 | | 3/2007 | Kooken et al. | |
| 2007/0114962 A1 | | 5/2007 | Grbovic | |

OTHER PUBLICATIONS

PCT/US2009/044598 International Search Report; 3 pages.

* cited by examiner

ENHANCED POWER FACTOR CORRECTION FOR WELDING AND CUTTING POWER SUPPLIES

REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to a welding-type system and, more particularly, to a system and method for correcting the power factor of in a welding-type power source using an artificial sinusoidal reference.

Welding-type systems, such as welders, plasma cutters, and induction heaters, often include an inverter-based power source that is designed to condition high power for carrying out a desired process. These welding-type power sources, often referred to as switched-mode power supplies, can take many forms. For example, they may include a half-bridge inverter topology, a full-bridge inverter topology, a forward-converter topology, a flyback topology, a boost-converter topology, a buck-converter topology, and combinations thereof.

Regardless of the specific inverter topology, the basic switched-mode power supply incorporates a full wave input rectifier connected to a large energy storing capacitor. The power supply draws current from an alternating current (AC) source in short pulses when the supplied voltage exceeds the voltage across the capacitor. As a result of this process, the power supply generates high harmonic content on the supply lines and also has a relatively low power factor. Harmonic content must be severely limited to satisfy EMC standards such as are found in the European Union. Additionally, a power supply with a poor power factor may not produce enough power to achieve a desired welding or cutting performance when the unconditioned power is supplied by a single phase branch circuit. Therefore, modern switched-mode power supplies, including those used in welding-type systems, typically include an active power factor correction (PFC) circuit or stage.

Referring now to FIG. 1, a prior art welding power supply 100 with an active power factor correction stage includes an input rectifier circuit 102, a boost-type preregulator 104, an inverter 106, an output circuit 108, and a controller 110. A source 112 provides AC line power to the power supply 100 typically at a voltage between 90 and 480 volts. The voltage may be either single or three-phase and in the United States, typically has a frequency of 60 hertz for utility-supplied power. The source 112 may be an ideal voltage source such as a utility transmission system having multiple power plants and transmission lines with minimal inductive line impedance. Alternatively, the power source 112 may be an engine-driven generator having high inductive line impedance and a varying frequency (often referred to as a "soft source").

The input rectifier circuit 102 receives the voltage from the source 112 and outputs a rectified sinusoidal voltage waveform onto a bus 114. The input rectifier circuit 102 is configured to rectify both three phase and single phase AC power. The input circuit 102 also includes a filtering capacitor (not shown) placed across the output of the input rectifier circuit 102. As is known in the art, the capacitor is used to comply with applicable EMC standards by decoupling high frequency EMC energy generated by the boost-type preregulator 104 and inverter 106 from the power source 112. The capacitor acts as a high frequency return path for the current ripple caused by the boost-type preregulator 104 and inverter 106.

The boost-type preregulator 104 receives the rectified sinusoidal voltage from the input rectifier circuit 102 via the bus 114 and produces a DC output voltage having a large and controllable magnitude, for example, 800 VDC. As is well known, the boost-type preregulator 104 includes at least one switching device (not shown) such as an IGBT or other semiconductor switch positioned between the positive and negative legs of the bus 114. The controller 110 directs the switching of the preregulator 104 at a frequency and duty cycle (or pulse width) to produce the predetermined DC bus voltage.

The inverter 106 receives the DC output voltage from the boost-type preregulator 104 and also includes a number of switching devices, such as IGBTs. The IGBTs of the inverter 18 are opened and closed in specific combinations by the controller 110 to sequentially generate pulses at a desired frequency and pulse-width. The pulses are converted by the output circuit 108 (such as with a second inverter or an output transformer, output rectifiers, and output inductor) to provide a constant magnitude DC welding output.

The boost-type preregulator 104 includes an active power factor correction stage. One popular PFC control methodology uses the line voltage waveform at the output of the input rectifier circuit 102 as a current reference for a current control loop in the controller 110. The controller 110 uses the current reference to determine the switching points of the preregulator 104 in order to shape the current pulled from the source 112 such that it mimics the input voltage waveform. By causing the current waveform to look like a scaled version of the AC input voltage waveform, the power supply 100 acts like a resistor, resulting in a high power factor. As the power factor approaches unity, the maximum line power becomes available for use by the welding power supply 100.

Maximum line utilization is especially important on 115V branch circuits because the available power of which is limited by fifteen amp (15 A) or twenty amp (20 A) circuit breakers. Consequently, it is necessary to maximize the available power to achieve the desired welding or cutting performance. The aforementioned power factor correction stage may be implemented using an integrated circuit, such as a UC3854 or an ML4821, or with discrete components.

However, one problem with this PFC control methodology is that in certain situations, the rectified line voltage used as the current reference becomes a function of the line impedance. This is especially problematic with a soft source such as an engine-driven generator that has a high (and variable) impedance compared to a building power distribution system.

For optimum power factor correction, the preregulator 104 input current is forced to be proportional to the AC input voltage waveform. If the line impedance is high, the voltage waveform at the output of the input rectifier circuit 102 used as the current reference becomes dependent on the current drawn from the source 112.

If the line impedance becomes too great, the line impedance may oscillate with the filtering capacitor of the power supply 100. These oscillations may show up in the voltage waveform and thus be reinforced by the controller 110 trying to shape the current drawn by the power supply 100 to match the input voltage waveform. Further, the rectified input voltage waveform may become distorted due to, among other things, the voltage divider effect of line and boost inductance as well as noise from the active switching of the preregulator 104. Consequently, a distorted, oscillating current waveform that does not match the input voltage waveform may be produced.

Therefore, it would be desirable to have a system and method for actively controlling the power factor correction stage in a power supply using a current reference that is not current dependent and does not become distorted.

SUMMARY

The present invention overcomes the aforementioned drawbacks by providing a system and method for controlling the power factor correction stage in a welding-type power source by using an ideal sinusoid for generating the current reference waveform.

In accordance with one aspect of the present invention, an welding-type power supply includes an input rectifier configured to convert a supplied AC power into a DC power having a rectified voltage waveform, a power conditioner configured to receive the DC power from the input rectifier and condition the DC power to have characteristics within a predefined set of thresholds, and an inverter configured to receive the conditioned power from the power conditioner and convert the conditioned power to AC power. The welding-type power source also includes a output rectifier configured to convert the AC power to DC welding-type power to drive a welding-type process and a controller. The controller is configured to monitor the rectified voltage waveform, calculate expected zero crossings in the supplied AC power based on the monitored rectified waveform, generate a sinusoidal current reference signal synchronized by the expected zero crossings, and improve a power factor of the power supply by controlling the input current using the sinusoidal reference signal.

In accordance with another aspect of the present invention, a method of correcting a power factor of a welding-type power supply is disclosed. The method includes rectifying power supplied to the welding-type device to create a rectified input voltage waveform, tracking the rectified voltage waveform, and calculating expected zero crossings in the supplied power. The method also includes generating a sinusoidal current reference using ideal sine wave values synchronized with the expected zero crossings and controlling the input current using the generated current reference to improve the power factor of the power supply.

Various other features of the present invention will be made apparent from the following detailed description and the drawings.

BRIEF DESCRIPTION OF THE DRAWINGS

The invention will hereafter be described with reference to the accompanying drawings, wherein like reference numerals denote like elements, and.

DETAILED DESCRIPTION

Figure 1:
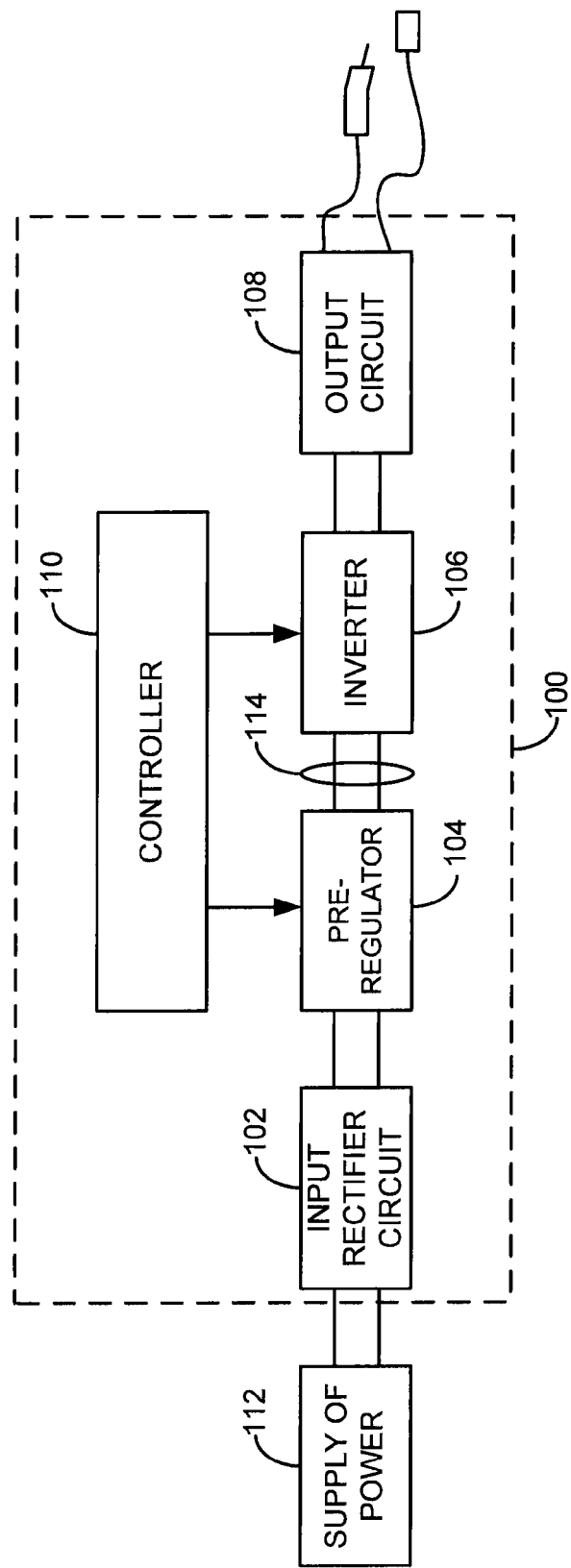
FIG. 1 is a schematic illustration of a prior-art, welding-type power supply.
Figure 2:
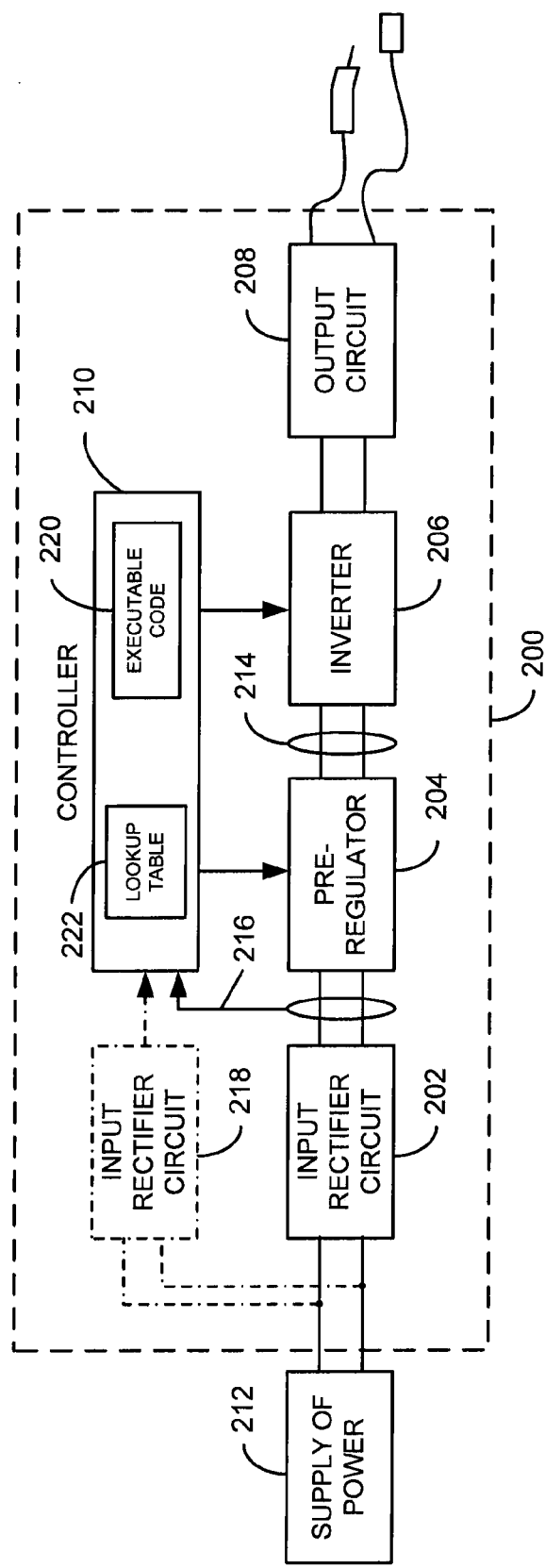
FIG. 2 is a schematic illustration of a welding-type power supply including a processing device capable of controlling the welding-type power supply to improve the power factor in accordance with the present invention.

Referring now to FIG. 2, a welding-type power supply 200 includes an input rectifier circuit 202, a boost-type preregulator 204 having an active power factor correction stage, an inverter 206, and an output circuit 208. The power supply 200 may be connected to an ideal power source 212 such as a utility grid transmission power line or a soft source, such as an engine-driven generator. As described above, AC power from the source 212 is rectified by the input circuit 202 into DC power, conditioned by the preregulator 204 to a much higher DC voltage, converted by the inverter 206 to AC power, rectified by the output circuit 208, and outputted to the welding terminals with the desired voltage and current characteristics. To this end, the welding-type power supply 200 is similar to that described above with respect to FIG. 1.

Unlike prior art systems, the welding-type power supply 200 may include a field programmable gate array (FPGA)-based controller 210 configured to actively control more than one process of the welding-type power supply 200. For example, the FPGA-based controller 210 is capable of controlling the switching of the preregulator 204 (and/or other power conditioning devices), the inverter 206, and, if included, a secondary inverter. An exemplary welding power supply with an FPGA-based controller is described in U.S. patent application Ser. No. 11/876,246 filed Oct. 22, 2007 and owned by the assignee of the present invention. However, other controller technologies could be used to implement aspects of the present invention.

Figure 4:
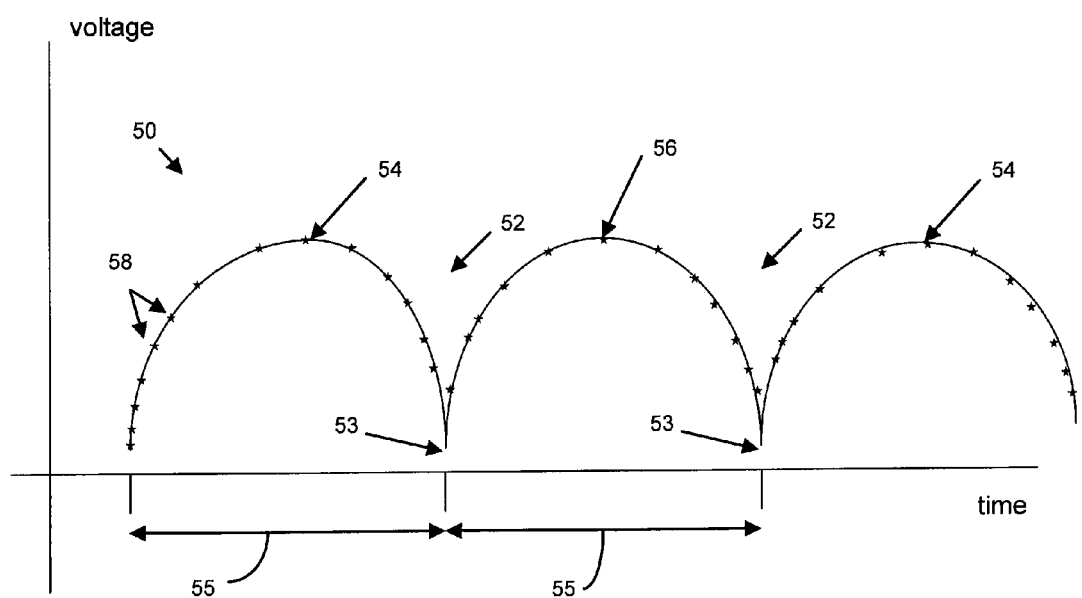
FIG. 4 is an exemplary cycle of a rectified input voltage waveform illustrating the sampling used to track the waveform.

With reference also to FIG. 4, the shape of the rectified input voltage waveform 50 at the output of the input circuit 202 is primarily a function of the number of phases of the supplied power. For example, when the power source 212 delivers three-phase power, the rectified voltage waveform has six peaks per cycle with minimal ripple between the peaks. As such, using the rectified three phase voltage waveform as a current reference provides minimal, if any, improvement in the power factor. When receiving single phase power, however, the rectified line voltage waveform 50 has two peaks 54, 56 per cycle with an easily measured ripple, or trough 52, between the peaks 54, 56. As such, a rectified single phase voltage waveform 50 can be much more easily and accurately tracked by the controller 210 and therefore used to actively improve the power factor of the power supply 200.

Figure 3:
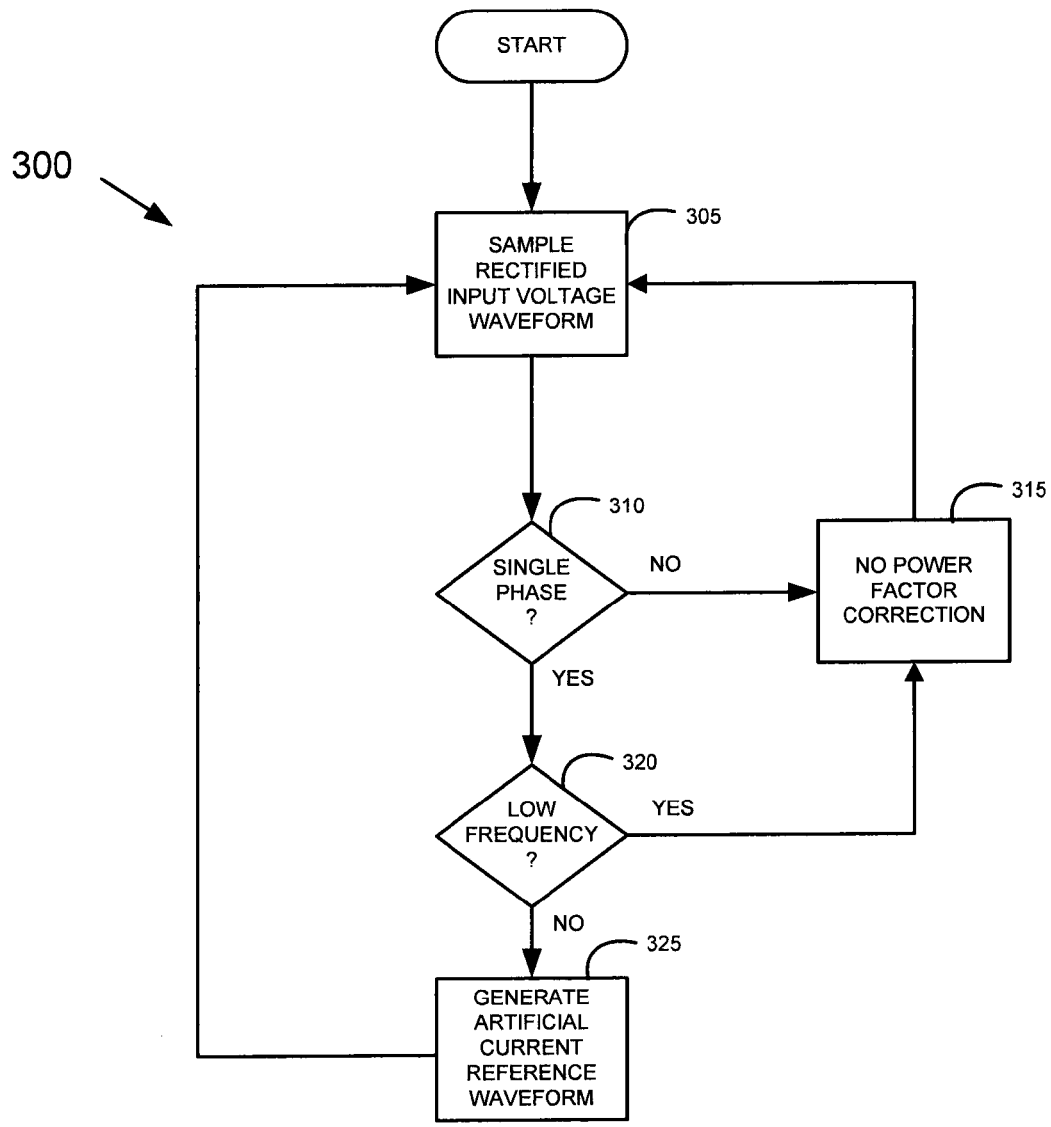
FIG. 3 is a flow chart detailing a method of correcting the power factor of the welding-type power supply of FIG. 2.

Referring now also to FIG. 3, the steps of a process 300 for correcting the power factor of the power supply 200 are shown. As explained in greater detail below, the controller 210 continuously determines whether the power supply 100 is supplied with single or three phase (or if one phase of a three-phase supply is dropped). Active power factor correction is attempted only when the supplied power is single-phase and has a frequency greater than a predetermined minimum. Beginning at step 305, the controller 210 continuously samples and filters the rectified input voltage waveform 50, with each sample 58 having, for example, a sixteen sample running average. In step 310, the controller 210 determines the phase of the supplied power by detecting a number of troughs 52 in the rectified voltage waveform 50 over a preset time period.

In one configuration, the rectified voltage waveform 50 is sampled at the output of the input rectifier circuit 202 via a feedback line 216. However, the filtering capacitor in the input rectifier circuit 202 may corrupt or distort the line voltage waveform 50 at light loads making trough detection difficult or erratic. If such a condition is detected, the controller 210 continues to track the rectified line voltage waveform 50 but does not attempt power factor correction.

Alternatively, a second input rectifier circuit 218 may be placed in parallel with the input rectifier circuit 202. The rectified voltage waveform 50 at the output of the second input circuit 218 is input into the controller 210 and used for zero cross detection as described above. It is contemplated that the voltage waveform 50 at the output of the second rectifier circuit 218 will be free from the distortion caused by the filtering capacitor in the first rectifier circuit 202. With only minimal distortion in the waveform 50, the controller 210 will be able to detect troughs 52 more consistently and reliably.

If it is determined that the supplied power is not single phase, such as by detecting the absence of troughs 52 during a preset time period, the controller 210, in step 315, treats the supplied power like DC power and does not attempt to correct the power factor. If it is determined that the supplied power is single phase, such as by detecting regular and predictable troughs 52 within the preset time period, the controller 210 proceeds to step 320. To reduce the risk of a false indication of single phase power, the first trough 52 detected within the preset time period may be ignored. In this case, after a second trough 52 is detected within the same time period, the controller 210 makes the determination that the supplied power is single phase. Other ways to determine the phase of the supplied power, such as by measuring the magnitude of the ripple voltage, are also contemplated.

In step 320, the controller 210 determines whether the frequency of the supplied power is lower than a predetermined frequency. In one configuration, the frequency of the waveform 50 by measuring the time between successive troughs 52 occurring within a given time period. The time period is predetermined based on a system clock to be large enough to handle the lowest anticipated input frequency. If the frequency of the supplied power is less than this anticipated frequency, the controller 210 does not attempt to correct the power factor, as shown at step 315. If the frequency of the supplied power is greater than the lowest anticipated input frequency, and thus amenable to power factor correction, the process 300 moves on to step 325. Other ways to determine the frequency of the supplied power are also contemplated.

As previously discussed, the controller 210 preferably does not use the rectified input voltage waveform 50 as a current reference for the power factor stage as in the prior art. The frequently varying load drawn by a welding power supply 200 creates variable-depth troughs 52 that never reach zero volts, greatly complicating the detection of the lowest point of the trough 52, hereinafter referred to as a zero-crossing event 53. Instead, the controller 210 generates an artificial, or 'ideal', sinusoidal current reference signal, shown as step 325, synchronized to match the detected zero-crossing events 53. The generated reference signal is further scaled by the controller 210 relative to the amplitude of the input voltage. The generated current reference signal is used by a hysteretic current control loop operating within the controller 210 to draw current having a waveform matching the input voltage waveform.

As shown in FIG. 4, the rectified voltage waveform 50 on the output side of the input rectifier circuit 102, has regularly zero-crossing events 53, rather than actual zero-crossings because the waveform 50 does not have a negative component. Each zero-crossing event 53 corresponds to an earlier zero-crossing in the AC input voltage waveform. Each trough 52 includes a portion of the rectified voltage waveform 50 approaching zero from a first peak value 54, culminating at a zero-crossing event 53 and increasing to a subsequent peak value 56. The amplitudes of the exemplary peaks 54, 56 of the rectified voltage waveform 50 are a function of the nominal input voltage and variations to the nominal voltage due to loading of the line by the power supply 200. The depth of each trough 52 is a function of the amount of power pulled through the PFC stage and nearly reaches zero volts at full power draw.

The controller 210 uses a routine stored in executable code 220 to track the rectified voltage waveform 50 by continuously sampling the rectified voltage. Zero-crossing events 53 are determined with an algorithm. In one configuration, the controller 210 uses peak trapping to determine the value of the first peak 54. The waveform 50 is peak trapped by replacing the stored sample 58 with the current sample 58 if the current sample 58 is higher than the stored sample 58. The stored, or trapped, value is held with a slow decay over many cycles such that the controller 210 is able to track the average peak value whether increasing or decreasing in value. When the rectified voltage is one half of the average peak value (as determined by comparing each sample 58 against one-half of the average peak value), a counter is started. The counter is stopped when the voltage on the subsequent half-cycle becomes greater than one half of the average peak value. The zero-crossing event 53 occurs at approximately the mid-point of the trough 52. Another counter is used to time out one half of the previous trough time period to determine the next zero-crossing event 53 (realized in one configuration by setting an internal zero-cross flag in the controller 210).

While still in step 325, the artificial current reference waveform is generated using a lookup table 222 accessible by the controller 210. The lookup table 222 includes a normalized (having a maximum value of 1) fixed-point representation of an ideal sine wave. In one configuration, one half of a full sine wave cycle (from zero to pi) is approximated with 1024 discrete points stored in the lookup table. Alternatively and because of the symmetrical nature of a sine wave, a quarter of the sine wave cycle could be approximated with the same number of points along with an indication of the waveform quadrant.

A 'half-period counter' is divided into the same number of sine points as are in the lookup table 222 (1024 equal parts in the present example) and is used as a reload value for a timer that triggers the controller 210 to obtain the next subsequent sine value from the lookup table 222. Until the timer expires, the current sine value is held and used in the voltage control loop.

The resulting current reference signal is a positive half-sine normalized digital waveform synchronized to the zero-crossings of the input voltage waveform. As long as the ideal sine wave is approximated with a large number of points, the consecutive step sizes in the generated sine waveform are small. The 'stair-step' shape of the waveform caused by the sample-and-hold nature of the sine lookup function creates negligible distortion. The amplitude of the sinusoidal current reference, as used in the hysteretic current control loop, is determined by the bus-voltage control loop, the desired bus voltage and the bus voltage feedback value. The generated waveform is scaled accordingly by the controller 210 and used to determine the boost converter switch points.

The zero-crossing event detection algorithm may also be used to track the input line voltage frequency. The controller 210 tracks the time periods 55 between each zero-crossing event 53, and is able to calculate the timing of subsequent expected zero-crossing events 53 (and thus the supplied voltage zero-crossings as well). The anticipated time periods 55 between troughs 52 may be increased if the controller 210 determines that the frequency of the supplied power is decreasing and vice-versa; thus, facilitating the tracking of the line input frequency.

Although useful for a number of reasons, tracking the input line frequency is particularly beneficial if the power source 212 is an engine-driven generator. Generators are typically idled when a high level of output power is not needed to reduce noise and emissions as well as increase fuel efficiency. For example, the output frequency from a typical engine-driven generator is designed to be 60 Hz at normal operation (3600 RPMs) but may drop as low as 30-40 Hz when the generator is idled due to low demand. By tracking the line frequency instead of solely reacting to the zero crossing events 53, the controller 210 quickly adjusts the current drawn by the power supply 200.

While the figures are a simplified overview of the various components and functions of the welding-type power supply 200, it is contemplated that additional components and functionality may be included. Additional components may include additional filters, feedback and control loops, and transformers or other converters designed to provide other desired output power characteristics. Additional functionality may include intelligent control of the power supply based on sensed welding parameters. For example, if a substantial load is present, the preregulator 204 can be preconditioned, such as with a brute strength algorithm, to provide the most power. If operating on single phase power, as detected by the voltage waveform, the controller 210 may limit the input power drawn by the preregulator 204 via a finesse strength algorithm.

Therefore, the above-described system is capable determining zero crossings in the input voltage by detecting troughs in the rectified input voltage waveform. Based on the expected zero crossings, an 'ideal' sinusoidal current reference signal is generated, synchronized by the detected troughs, to correct the power factor of a welding power supply. The generated current reference is free from any distortions present on the rectified input voltage. The improved power factor allows the power supply to maximize power utilization of the line as may be needed on a single phase branch circuit.

The present invention has been described in terms of the various configurations, and it should be appreciated that many equivalents, alternatives, variations, and modifications, aside from those expressly stated, are possible and within the scope of the invention. Therefore, the invention should not be limited to a particular described configurations.

We claim:

1. A welding-type power supply comprising:
   an input rectifier configured to receive a supplied AC power and convert the supplied AC power to a DC power having a rectified voltage waveform;
   a power conditioner configured to receive the DC power from the rectifier and condition the DC power to have characteristics within a predefined set of thresholds;
   an inverter configured to receive the conditioned power from the power conditioner and convert the conditioned power to AC power;
   an output rectifier configured to convert the AC power to DC welding-type power to drive a welding-type process; and
   a controller configured to:
      monitor the rectified voltage waveform;
      calculate expected zero crossings of the supplied AC power based on the rectified voltage waveform;
      generate a sinusoidal reference signal based on the expected zero crossings; and
      adjust a current drawn by the power supply based on the sinusoidal reference signal to improve a power factor of the power supply.

2. The welding-type power supply of claim 1, wherein the controller is further configured to monitor the rectified voltage waveform by sampling the rectified voltage at regular intervals.

3. The welding-type power supply of claim 1, wherein the controller is further configured to detect zero-crossing events in the rectified voltage waveform.

4. The welding-type power supply of claim 1, wherein the controller is further configured to track time periods during which the rectified voltage is less than a threshold voltage and determine the occurrence of a zero-crossing event based on a preceding time period.

5. The welding-type power supply of claim 4, wherein the zero-crossing event is determined to occur at one half of the preceding time period from when the rectified voltage fell below the threshold voltage.

6. The welding-type power supply of claim 5, wherein the threshold voltage is one half of an average rectified waveform peak value.

7. The welding-type power supply of claim 3, wherein the controller is further configured to calculate a frequency of the supplied AC power based on time periods occurring between detected zero-crossing events.

8. The welding-type power supply of claim 7, wherein the expected zero crossings of the supplied AC power are determined based on the calculated frequency of the supplied AC power.

9. The welding-type power supply of claim 8, wherein time periods between expected zero crossings are increased if the frequency of the supplied AC power is determined to be decreasing.

10. The welding-type power supply of claim 8, wherein time periods between expected zero crossings are decreased if the frequency of the supplied AC power is determined to be increasing.

11. The welding-type power supply of claim 1, wherein the controller is configured to generate the sinusoidal reference signal with normalized values representative of an ideal sine wave.

12. The welding-type power supply of claim 11, further comprising a memory accessible by the controller and configured to store the normalized sine wave values.

13. The welding-type power supply of claim 12 wherein the normalized sine wave values are stored in a lookup table.

14. The welding-type power supply of claim 13, wherein the controller is further configured to synchronize zero crossings in the generated sinusoidal reference signal with the expected zero crossings.

15. The welding-type power supply of claim 1, wherein the controller includes an FPGA-based processor.

16. The welding-type power supply of claim 1, further comprising a sampling rectifier configured to rectify the supplied power; wherein the controller monitors a voltage waveform output from the sampling rectifier.

17. A method of correcting a power factor of a welding-type device comprising:
   rectifying power from a power supply, the rectified power supplied to the welding-type device to create a rectified voltage waveform;
   tracking the rectified voltage waveform;
   determining expected zero crossings in the supplied power;
   generating a sinusoidal current reference using ideal sine wave values synchronized with the expected zero crossings; and
   controlling a current drawn by the power supply with the generated current reference to improve the power factor of the power supply.

18. The method of claim 16, further comprising:
  detecting zero-crossing events in the rectified voltage waveform; and
  calculating a frequency of the supplied power based on the detected zero-crossing events;
  wherein the expected zero crossings of the supplied power are determined based on the calculated frequency.

19. The method of claim 17, wherein the detecting zero-crossing events step includes:
  measuring a period of time that the rectified input voltage is less than a predetermined value; and
  determining, if the rectified input voltage subsequently becomes less than the predetermined value, that a zero-crossing event has occurred at a point of time equal to one half of the preceding time period after the input voltage became less than the predetermined threshold.

20. The method of claim 16, further comprising:
  scaling the generated sinusoidal current reference based on a desired power supply voltage level.

\* \* \* \* \*